UNITED STATES PATENT OFFICE.

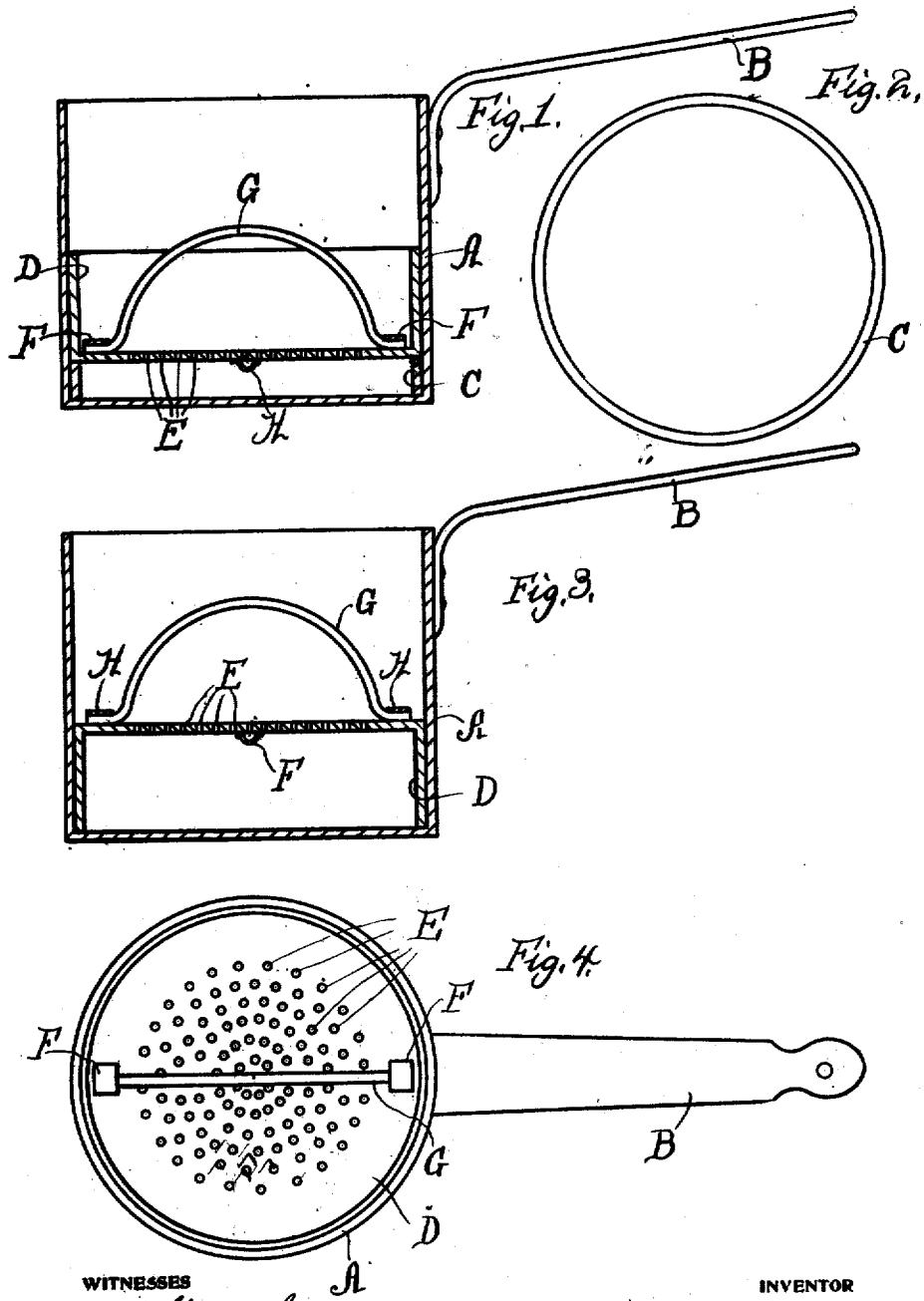

WILLIAM LEETTEN, OF MANAYUNK, PENNSYLVANIA.

VEGETABLE STRAINER OR COOKER.

No. 931,070.　　　Specification of Letters Patent.　　　Patented Aug. 17, 1909.

Application filed June 11, 1908.　Serial No. 437,813.

*To all whom it may concern:*

Be it known that I, WILLIAM LEETTEN, a citizen of the United States, residing at Manayunk, county of Philadelphia, and State of Pennsylvania, have invented a certain new and useful Improvement in Vegetable Strainers or Cookers, of which the following is a specification.

My invention relates to a new and useful improvement in strainers or cookers and has for its object to provide an exceedingly simple and effective device of this character which may be placed in a pan or pot so that sand may be strained from the vegetables such as asparagus and spinach while they are being cooked, and when the vegetables are removed from the pot the sand will remain therein.

With these ends in view, this invention consists in the details of construction and combination of elements hereinafter set forth and then specifically designated by the claim.

In order that those skilled in the art to which this invention appertains may understand how to make and use the same, I will describe its construction in detail, referring by letter to the accompanying drawing forming a part of this specification, in which—

Figure 1 is a sectional view of a pot, with my improvement applied thereto. Fig. 2, a plan view of the ring. Fig. 3, a sectional view of a pot showing my improvement applied thereto without the use of the ring. Fig. 4, a plan view of Fig. 4.

In carrying out my invention as here embodied, A represents a pot which may be of any suitable size, and to this is secured the handle B.

C indicates a ring which may be made of any suitable material, and which may be made in different sizes to fit different sized pots. When in use this ring fits against the inner surface of the pot and rests against the bottom thereof. On the top of this ring C rests the strainer D which may be stamped from a piece of metal to form the cup-like member as clearly shown in Fig. 1.

In the bottom of the cup-like member or strainer D are formed the openings E, through which the sand is adapted to pass when it has been dislodged from the vegetables, or for that matter any other articles being cooked. The said openings E are so formed in the bottom as to leave considerable space between the outer holes and the edge of the sides of the strainer or cup-like member. The lugs F are secured on the inner surface of the bottom of the strainer, and in this are placed the ends of the movable and detachable handle G, so that the strainer may be removed from the pot when it is not wanted for use. The lugs H are secured to the outer surface of the bottom of the strainer, so that the handle G may be placed therein when the strainer D is turned up side down or used without the ring C as clearly shown in Fig. 3.

In practice the strainer is placed in the pot, then the vegetables placed therein resting upon the bottom of said strainer, and as the water boils it will dislodge the sand, which will then pass downward through the openings E into the lower portion of the pot where it remains. When the pot is turned to one side the vegetables and the juice from the same will run out of the pot but the sand will remain therein because of the closed portion between the holes and the edge or sides of the strainer.

Of course I do not wish to be limited to the exact details of construction here shown as these may be varied within certain limits without departing from the spirit of my invention.

Having thus fully described my invention what I claim as new and useful is—

In combination with a pot, a removable ring adapted to fit therein and rest against the bottom of said pot, a strainer composed of a cup like member having a bottom, a portion of which is perforated and an outer portion of which is imperforate, lugs secured to both sides of the bottom of said cup like member, and a movable and detachable handle the ends of which are adapted to fit within said lugs, as specified.

In testimony whereof, I have hereunto affixed my signature in the presence of two subscribing witnesses.

WILLIAM LEETTEN.

Witnesses:
　EDW. W. AUSTIN.
　S. M. GALLAGHER.